United States Patent [19]

Fairhurst

[11] Patent Number: 5,233,410
[45] Date of Patent: Aug. 3, 1993

[54] INTERPOLATING DIGITAL SIGNAL CLIPPING CIRCUIT AND COMPOSITE VIDEO CLIPPING CIRCUIT UTILIZING SAME

[75] Inventor: Jon Fairhurst, Grass Valley, Calif.

[73] Assignee: The Grass Valley Group, Inc., Nevada City, Calif.

[21] Appl. No.: 745,301

[22] Filed: Aug. 15, 1991

[51] Int. Cl.$^5$ .............................................. H04N 9/64
[52] U.S. Cl. ........................................ 358/22; 358/27; 358/28
[58] Field of Search ................... 358/21 R, 22, 27, 28, 358/138, 37, 160

[56] References Cited

U.S. PATENT DOCUMENTS

| | | | |
|---|---|---|---|
| 4,949,177 | 8/1990 | Bannister | 358/138 |
| 4,953,008 | 8/1990 | Kaye | 358/28 |
| 4,987,482 | 1/1991 | Imai | 358/41 |

*Primary Examiner*—Tommy P. Chin
*Attorney, Agent, or Firm*—John Smith-Hill

[57] ABSTRACT

An interpolating digital signal clipping circuit provides pre-clipping of the luminance component of a video signal. A difference circuit adjusts each sample so that a single bit indicates whether the sample value is closer to a positive or negative clipping limit. Interpolated samples are produced by phase shifting FIR filters and are applied, along with the actual current sample, to a minimum or maximum selecting circuit that selects the minimum or maximum sample depending on the state of the indicating bit. The selected sample is compared with the clipping limits to produce an excess signal that indicates how much the selected sample exceeds the relevant clipping limit. A gain control signal is generated to be a "1" when no clipping is required and less than one when clipping is required. A digital video signal clipping circuit receives this pre-clipped luminance signal and adjusts each sample as above. Multipliers square the chrominance components, and an adder adds the squares and applies the output as addresses to a memory that produces a chrominance magnitude signal. The chrominance magnitude signal is combined with the adjusted luminance signal to obtain a composite magnitude signal. Again, a gain control signal is generated that is a "1" when no clipping is required and less than one when clipping is required, and this signal is used to reduce the video components before they are combined into a clipped composite video output.

30 Claims, 13 Drawing Sheets

SIGNAL IN

CLIPPED SIGNAL OUT

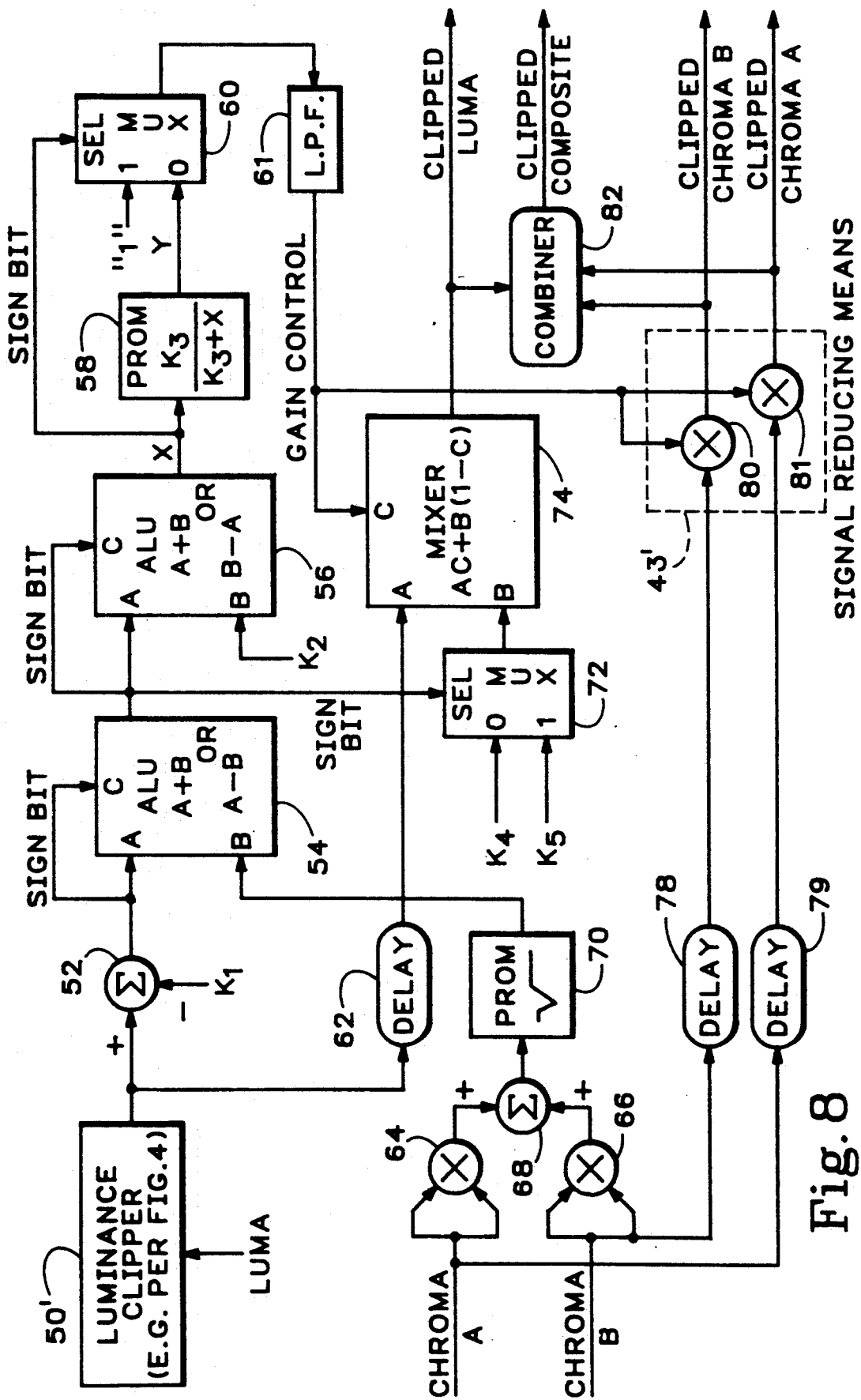

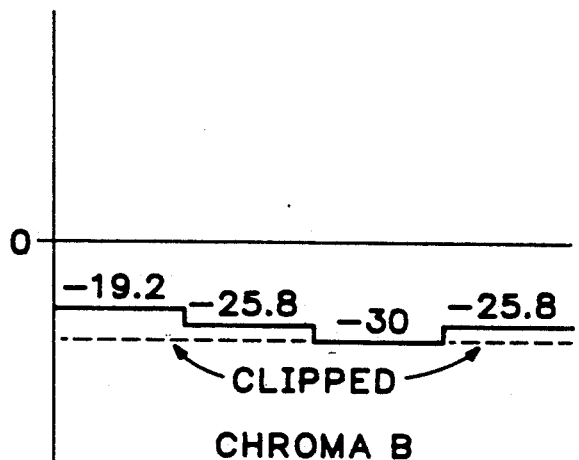
Fig. 9J CHROMA B
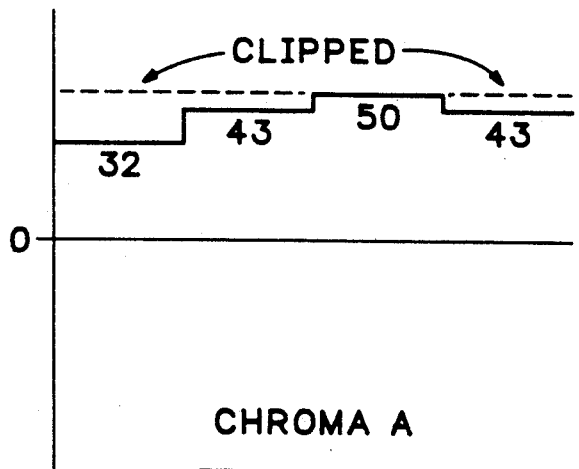
Fig. 9K CHROMA A
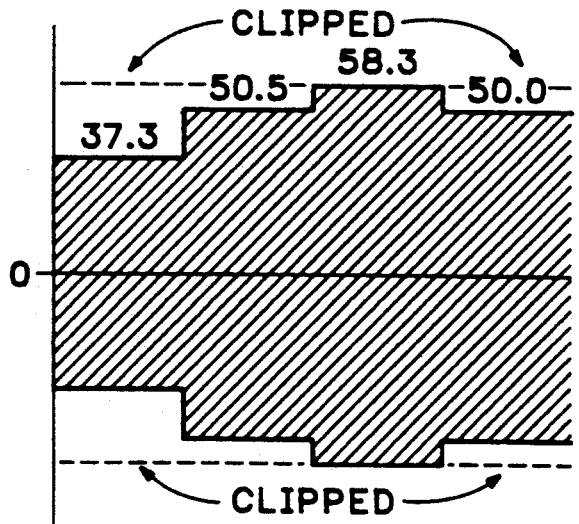
Fig. 9L

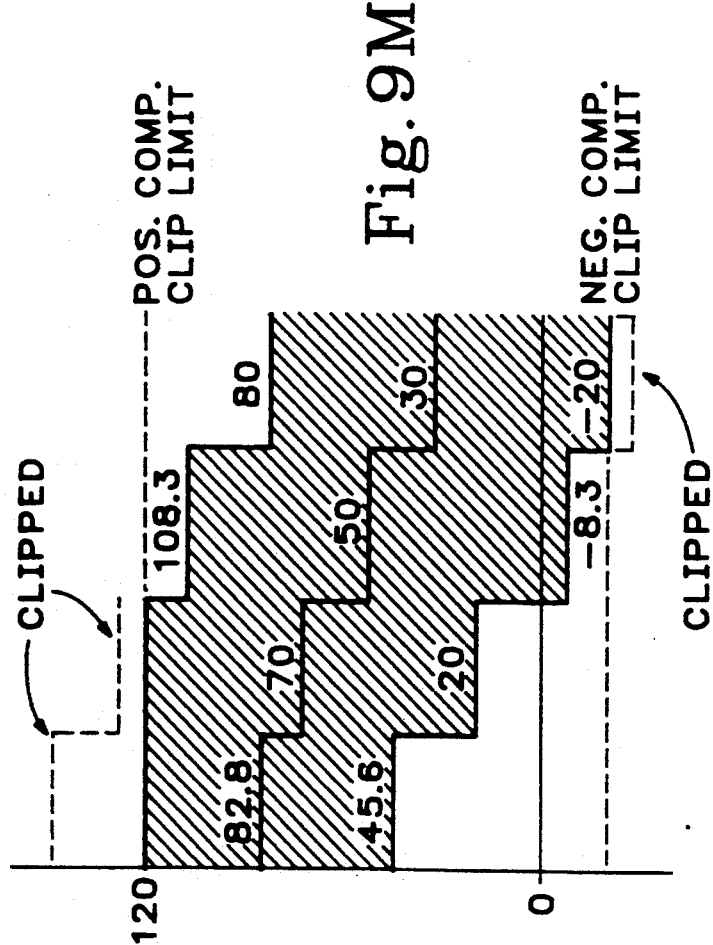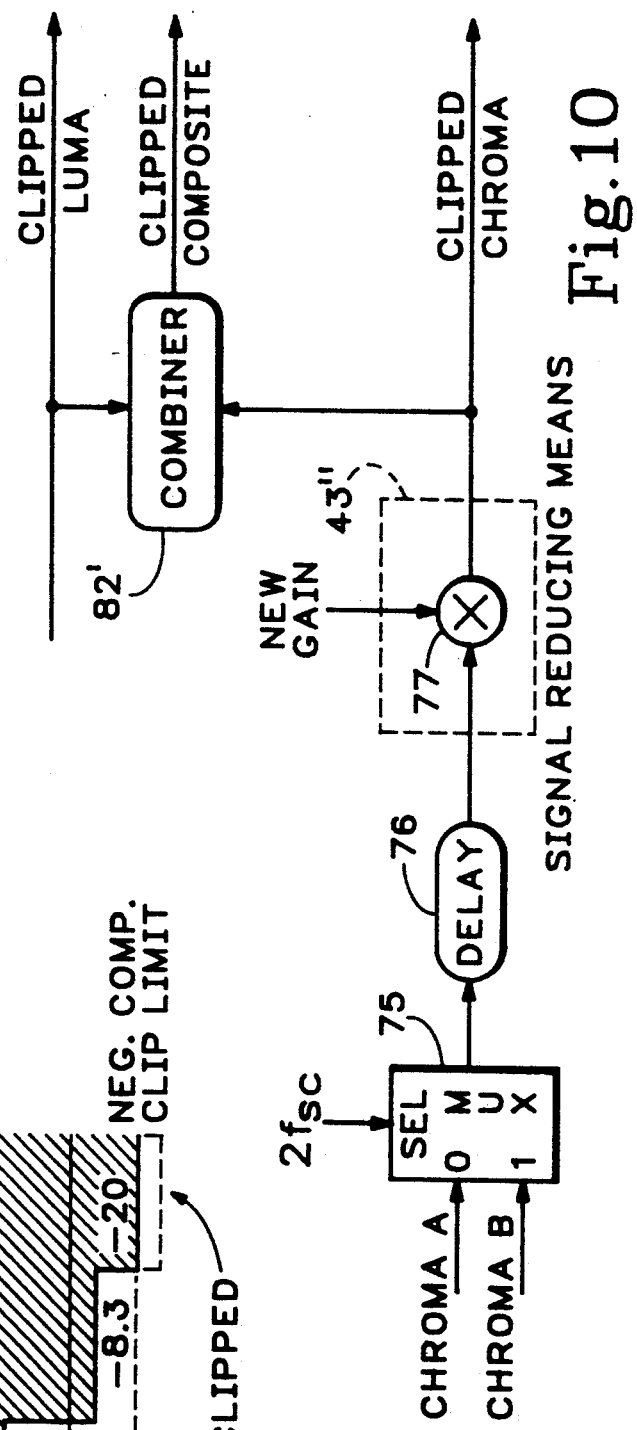
Fig. 9M
Fig. 10

INTERPOLATING DIGITAL SIGNAL CLIPPING CIRCUIT AND COMPOSITE VIDEO CLIPPING CIRCUIT UTILIZING SAME

BACKGROUND OF THE INVENTION

This invention relates to the clipping of digital signals, and more particularly to clipping of digital video luminance and chrominance components so that the resulting composite digital video signals are within desired clipping limits.

A typical prior art digital clipping circuit is shown in FIG. 1. As long as the value of the input signal is less than the positive clipping level and greater than the negative clipping level, the input signal is passed through the multiplexers to be the clipped signal output. However, if the value of the input signal becomes greater than the positive clipping level, the positive clipping level is substituted for the input signal as the clipped signal output. And, similarly, if the value of the input signal becomes less than the negative clipping level, the negative clipping level is substituted for the input signal as the clipped signal output.

Ideally, performing clipping operations on a signal input such as that shown in FIG. 2A leads to a clipped signal output as shown in FIG. 2B. However, in a digital implementation of a clipping circuit, as the frequency of the signal being clipped increases and begins to approach half of the sampling frequency, clipping of the individual sampled points does not necessarily provide adequate clipping of the reconstructed analog signal.

FIGS. 3A through 3C illustrate the problem that results from a low sampling rate relative to the frequency of the signal being clipped. The waveform shown in FIG. 3A clearly exceeds the positive and negative clipping levels indicated by the dotted lines. Even though four samples are taken, only one of these is a sample that occurs during the time that the signal is in excess of the clipping levels, and that sample occurred when the signal was only slightly above the positive clipping threshold. The whole negative excursion of the waveform below the negative clipping threshold occurred between the third and fourth sample points and, consequently, was not detected and produces no clipping. Thus, it can be seen that, at a low relative sampling rate, the effectiveness of the clipping of the signal depends on the phase relationship between the signal and the sampling times.

As can be seen in FIGS. 3B and 3C, even though the second sample is clipped to the positive clipping level and this somewhat diminishes the positive going amplitude of the reconstructed waveform, the reconstructed waveform still exceeds both clipping levels, especially the negative one. Moreover, the partial clipping that does occur introduces into the reconstructed waveform phase distortion and discontinuities that appear as higher frequency components.

Of course, a higher sampling rate is always one approach to avoiding this problem, but oversampling itself can produce some undesirable effects such as ringing, and is not economically feasible or technically desirable in most circumstances.

As shown in FIG. 7, conventional video processing amplifiers of the prior art generally include a circuit to permit controllable clipping of the luminance level before it is re-combined with the chrominance signal to produce the composite video and another circuit to permit controllable clipping of the composite video signal after the luminance and chrominance have been combined. A limitation that is inherent in this approach is that the composite signal is "hard" clipped without any attention to the subtleties of its component parts.

SUMMARY OF THE INVENTION

It is an object of the present invention to provide a digital clipping circuit that can better analyze incoming signals and clip them more effectively to avoid the problems associated with undersampling in a clipping environment, i.e., phase distortion and the introduction of high frequency components.

According to a first aspect of the invention there is provided an interpolating digital signal clipping circuit. This circuit includes a difference circuit for adjusting each sample of an input signal so that when an indicating bit of the current sample is in one state the current sample is closer to a positive clipping limit and when the indicating bit is in the other state the current sample is closer to a negative clipping limit. The adjusted samples are then provided to phase shifting FIR filters and a delay element that produce a plurality of interpolated samples and a delayed current sample, respectively. The interpolated samples and delayed current sample are applied to a minimum or maximum selecting circuit that selects which sample among the interpolated samples or the delayed current sample is the minimum or maximum depending on the state of the indicating bit of the delayed current sample.

An arithmetic logic unit (ALU) determines when and by how much the selected minimum sample exceeds the negative clip limit or the selected maximum sample exceeds the positive clip limit, and produces an excess signal containing this information. A memory is addressed by the excess signal to produce a reduced gain signal according to the function $K(K+X)$, where K is nominally one half of the sum of the positive clipping limit and the negative clipping limit and X is the excess signal. The reduced gain signal is used as a gain control signal when the excess signal is positive, and unity is used as the gain control signal when the excess signal is negative. Finally, the input signal is reduced according to the gain control signal to produce a clipped output signal.

It is an object of the present invention to provide a digital video clipping circuit architecture that will selectively allocate video clipping between the luminance component and the two chrominance components in a more subtle and sophisticated manner based on analyzing in advance the combined magnitude of the luminance and chrominance components.

According to a second aspect of the invention there is provided a digital video signal clipping circuit in which the luminance signal is pre-clipped by an interpolating digital signal clipping circuit as described above. After this pre-clipping, a summing circuit adjusts each sample of the input luminance signal so that when an indicating bit of a luminance sample is in one state the adjusted luminance sample is closer to a positive clipping limit and when the indicating bit is in the other state the adjusted luminance sample is closer to a negative clipping limit.

Multipliers multiply the first and second chrominance components by themselves to produce outputs that are the squares of the chrominance components. A summing circuit receives the squared chrominance components and sums them. A PROM addressed by the output of the summing circuit implements a square-root function and produces a chrominance magnitude signal. An ALU receives the adjusted luminance signal on its A input and the chrominance magnitude signal on its B input and produces a composite magnitude signal by performing A+B when the sign bit of the adjusted luminance signal is zero and A−B when the sign bit is one. Another ALU determines when and by how much the composite magnitude exceeds the negative clip limit or the positive clip limit, and produces an excess signal reflecting the relationship of the composite magnitude signal to a constant, the constant being nominally equal to minus one half of the difference between the negative and positive clipping limits.

A second PROM converts the excess signal to a reduced gain signal according to the function K(K+X), where K is nominally one half of the sum of a positive clipping limit and a negative clipping limit and X is the excess signal. The output of the PROM is used as a gain control signal when the excess signal is positive, while a "1" is used when the excess signal is negative. The video signal components are then reduced according to the gain control signal by mixing and/or multiplying to produce clipped video output components that may be combined to form a clipped composite video output.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

BRIEF DESCRIPTION OF THE DRAWINGS

FIG. 8 is a block diagram of a digital video clipping circuit according to the present invention;

FIGS. 9A–9M are illustrations of an example demonstrating the operation of the circuitry of FIG. 8; and FIG. 10 shows chrominance signal reduction circuitry that is an alternative to that shown in FIG. 8.

DETAILED DESCRIPTION

Figure 4:
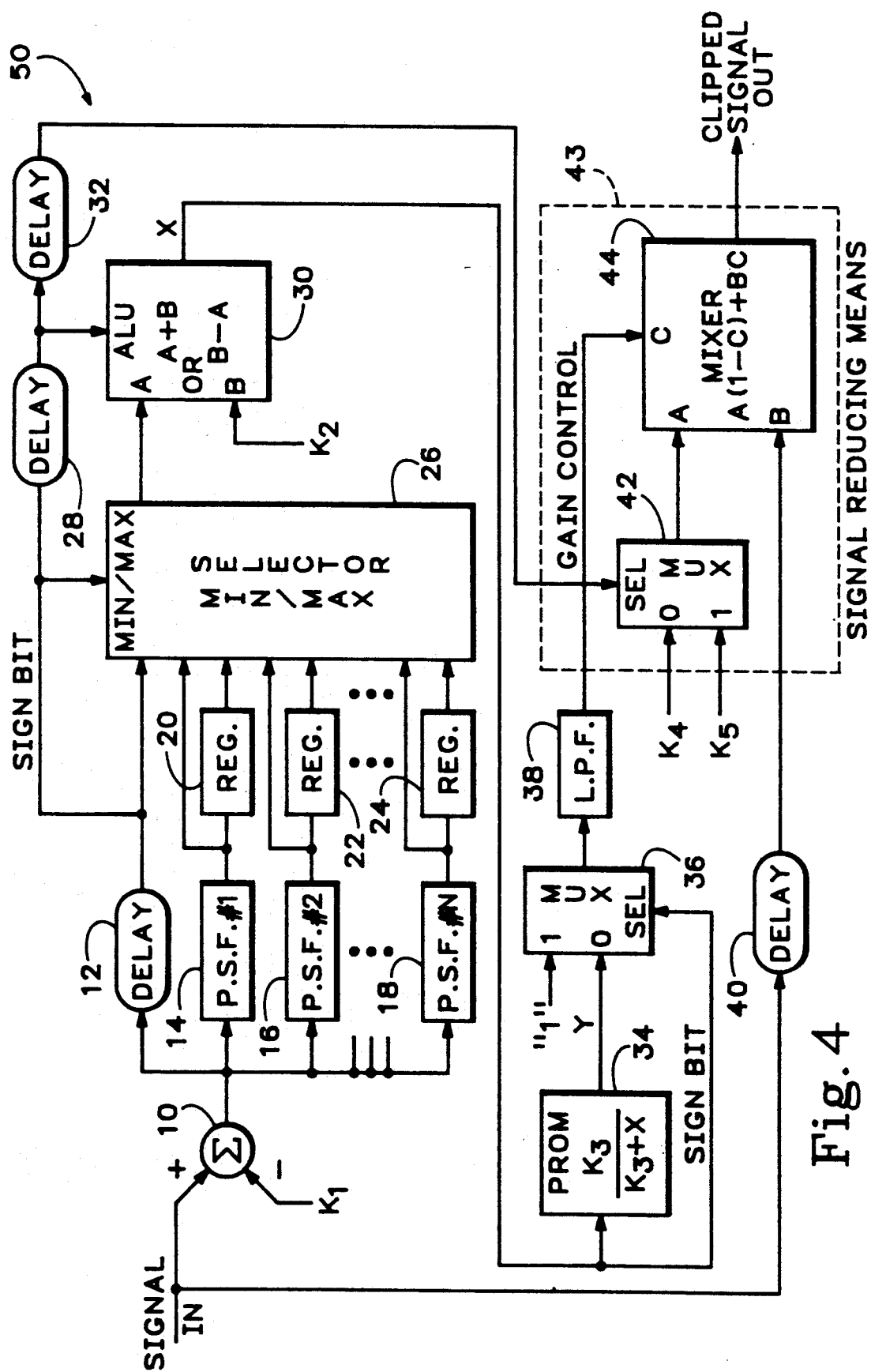
FIG. 4 is a block diagram of a digital clipping circuit according to the present invention.

FIG. 4 is a block diagram of an interpolating digital clipping circuit 50 according to the present invention. Incoming digital signal values are applied to the plus input of a summing circuit 10. The other input to the summing circuit 10 is subtracted from the input signal to produce an adjusted signal. The adjustment factor on the negative input to the summing circuit 10 is a constant, $K_1$, defined as follows $$K_1 = (L_{p.sel} + L_{n.sel})/2 \tag{1}$$

where $L_{p.sel}$ is the selected positive clip limit and $L_{n.sel}$ is the selected negative clip limit.

Figure 6A:
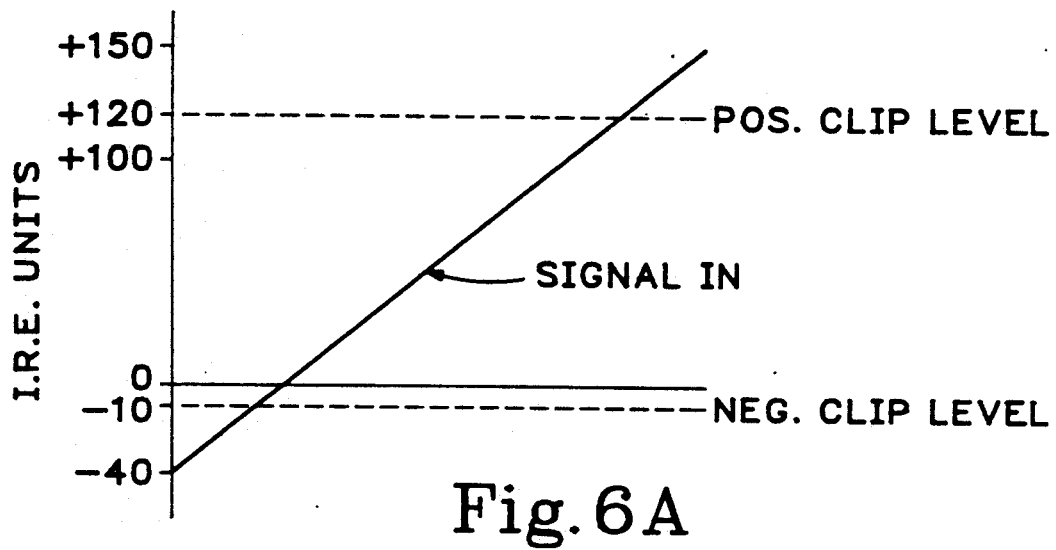
FIGS. 6A–6E are illustrations of an example demonstrating the operation of the circuitry of FIG. 4.
Figure 6B:
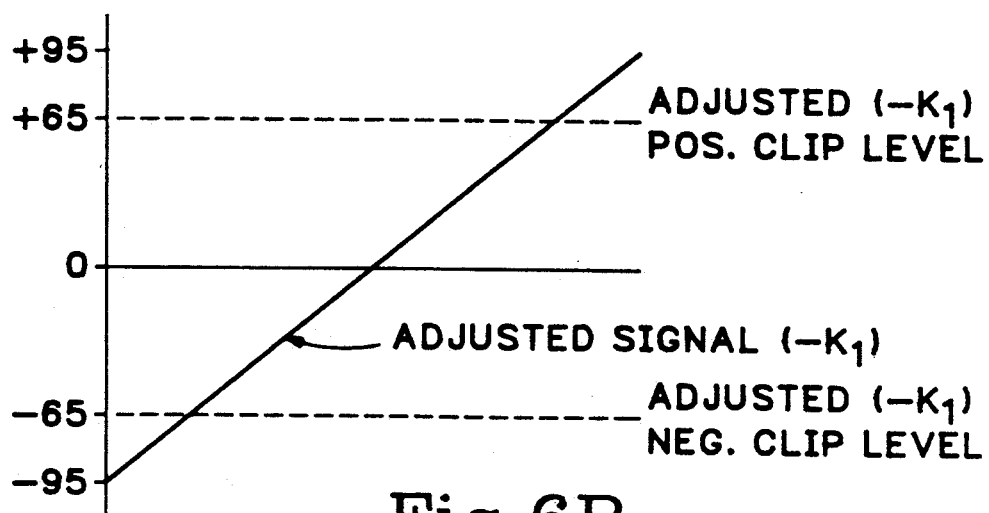

As shown in FIGS. 6A and 6B, this subtraction causes the adjusted signal to be a level shifted version (FIG. 6B) of the input signal (FIG. 6A) that has been shifted down by one half of the range between the two clipping limits currently selected by the operator. As a result of this operation, the clipping range is symmetrically disposed around zero. In FIG. 6A the selected positive clip limit is +120 and the selected negative clip limit is −10, so $K_1$ is +55. Consequently, the line extending from −40 to +150 in FIG. 6A is shown displaced to extend from −95 to +95 in FIG. 6B as a result of the subtraction of $K_1$.

A microprocessor (not shown) calculates $K_1$ based on the operator's selections and then down loads the result to this circuit. The clipping limits shown in FIG. 6A, −10 IRE (Institute of Radio Engineers units) for the negative clipping limit and +120 IRE for the positive clipping limit, limit and are the nominal clipping limits to which further reference will be made later. For now, it will be assumed that the operator's selections are the same as the nominal clipping limits.

After the input signal has been level shifted to produce the adjusted signal, a positive sign on the adjusted signal value indicates that the signal is in the top half of the range defined by the selected positive and negative clipping limits, while a negative sign indicates that the adjusted signal value is in the bottom half of that range.

The adjusted signal is then applied to the input of delay element 12 and phase shifting filters 14–18. The phase shifting filters 14–18 are multiple tap FIR (finite impulse response) filters which are non symmetrical and which have a nominally flat frequency response over the frequency range of interest. Each filter implements a phase shift that is equal to the sample period divided by the number of filters plus one. For high precision, five or more filters of at least 20 taps could be used. However, two to four filters of approximately 10 taps have been found to be sufficient to provide adequate precision for video applications. For additional information on the construction of suitable filters, as defined above, see "Theory and Application of Digital Signal Processing" by Rabiner and Gold, 1975, published by Prentice-Hall, and hereby incorporated by reference.

The outputs of each of the phase shifting filters 14–18 are applied to registers 20–22, which each serve to provide a one sampling clock period delay, so that delayed values from the previous cycle are held and appear as advanced in time relative to the current sampling point.

Figure 5:
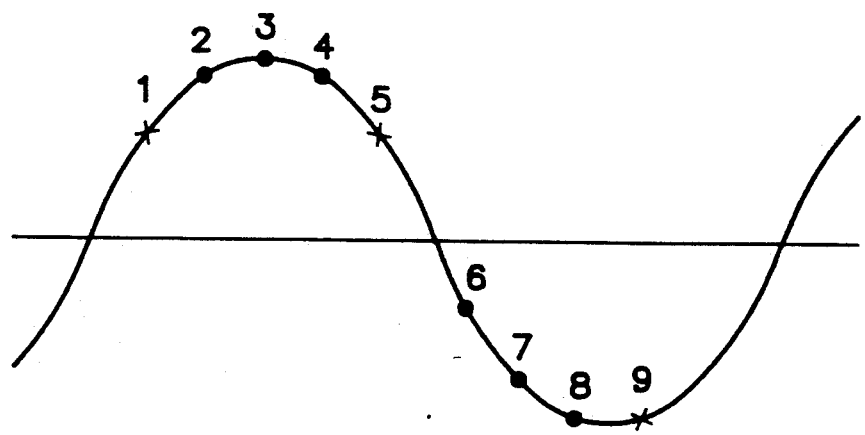
FIG. 5 is an illustration of how interpolated virtual samples produced according to the present invention are related in time to the actual samples.

Referring to FIG. 5, a previous pixel is seen to have been sampled at point 1, while a present pixel is sampled at point 5 and a next pixel is sampled at point 9. The data at the other points, 2–4 and 6–8, are the outputs of the three phase shifting filters 14–18 and registers 20–24, as shown in the following table:

| SOURCES OF INTERPOLATED SAMPLES | | |
|---|---|---|
| POINT | SOURCE | TIMING* |
| 2 | Reg. 20 | ¾ Advanced |
| 3 | Reg. 22 | ½ Advanced |
| 4 | Reg. 24 | ¼ Advanced |
| 5 | Delay 12 | 0 |
| 6 | P.S.F. #1 | ¼ Delayed |
| 7 | P.S.F. #2 | ½ Delayed |

| SOURCES OF INTERPOLATED SAMPLES | | |
|---|---|---|
| POINT | SOURCE | TIMING* |
| 8 | P.S.F. #N = 3 | 1 Delayed |

*relative to point 5, in units of sampling periods

The outputs of each of the phase shifting filters 14-18 and each of the registers 20-24 are all applied to the inputs of min./max. selector 26. The sign bit of the current pixel value from the delay element 12 is used to control whether the min./max. selector 26 is selecting for the minimum or the maximum of these values. If the sign bit is positive, indicating that the current sample is in the top half of the range between the clipping limits, the maximum of the input values is selected. Conversely, if the sign bit is negative, indicating that the current sample is in the bottom half of the range between the clipping limits, the minimum of the input values is selected. This output is a selected interpolated or current video value.

The selected interpolated or current video value output of the min./max. selector 26 is applied to the A input of ALU (arithmetic logic unit) 30. The B input to ALU 30 is another constant, $K_2$, defined as follows:

$$K_2 = -(L_{p.sel} - L_{n.sel})/2 \quad (2)$$

The ALU 30 receives as a control input the (twice) delayed sign bit from the adjusted signal current value and either performs A+B or B−A according to the content of this bit. ALU 30 adds the output of the selector, the selected interpolated or current video value, to $K_2$ if the delayed sign bit is positive (zero), and subtracts the output of the selector from $K_2$ if the delayed sign bit is negative (one). Using the selected positive and negative clip limits shown in FIG. 6A in formula (2) for $K_2$ yields:

$$K_2 = -(120 - (-10))/2 \quad (2a)$$
$$= -65$$

Figure 6C:
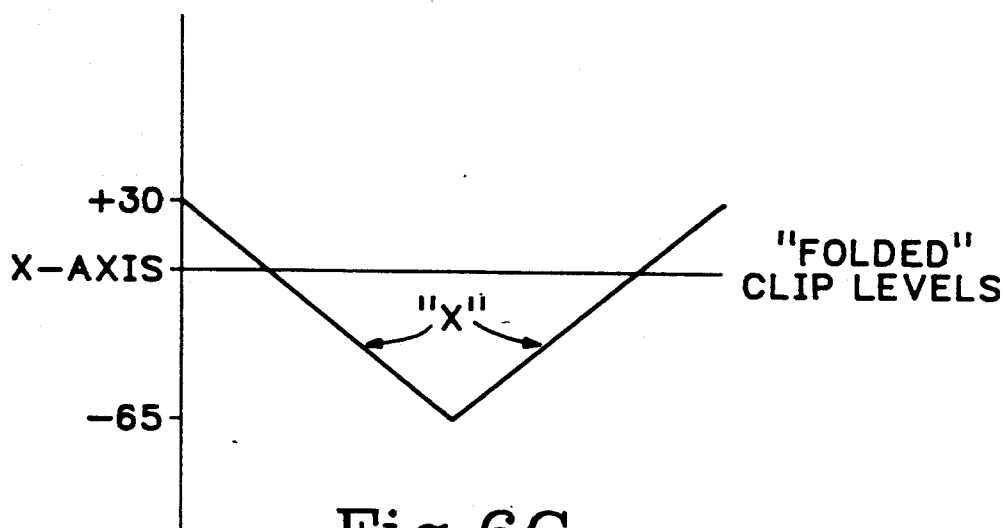

Referring now to FIGS. 6B, it can be seen that the sign bit is negative for all of the current and interpolated values associated with points below the zero level and positive for all of those above the zero level. Therefore, the A and B inputs of ALU 30 are added to −65 for all points along the adjusted signal line that are to the left of the point where that line intersects the x-axis, and A is subtracted from B for all points that are to the right of the point where that line intersects the x-axis. The result is shown in FIG. 6C. The selected positive and negative clipping limits have now been effectively "folded" to be coincident with the x-axis in FIG. 6C.

Thus, the output of ALU 30 in FIG. 4, the signal X, when it has a positive value, represents the amount that the selected interpolated or current video value exceeds either the selected positive or the selected negative clipping limit. When the output of ALU 30 is negative, neither clipping limit was exceeded by either the current value or any of the interpolated values associated with the current value.

The X signal is used to address PROM 34 which implements the function $K_3/(K_3+X)$ to produce its output Y, where $K_3$ is defined as follows:

$$K_3 = (L_{p.nom} + L_{n.nom})/2 \quad (3)$$

where $L_{p.nom}$ is the nominal positive clip limit and $L_{n.nom}$ is the nominal negative clip limit.

The sign bit of the signal X is used to select the inputs of multiplexer 36. The output of multiplexer 36 is a gain signal that is filtered by (optional) low-pass filter 38 and applied to the control input of mixer 44. This gain signal, as will be discussed in more detail below, is used to control how much of the signal input will be part of the clipped signal output. The low-pass filtering prevents instantaneous gain changes that could result in aliasing. Low-pass filter 38 preferably has a symmetrical response time of approximately one to two sample periods.

Figure 6D:
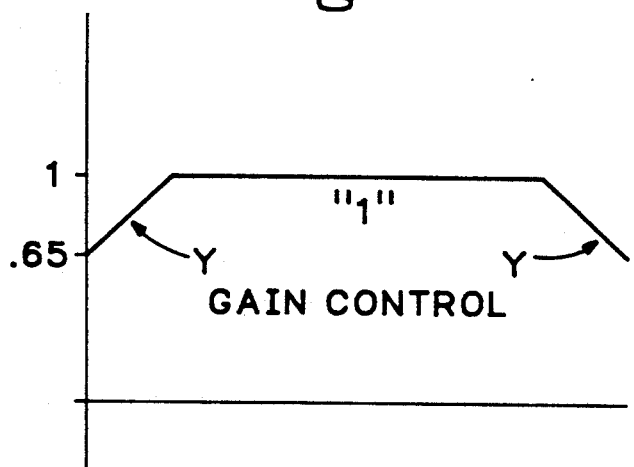

When the sign bit of X is a one, indicating a negative value of X, the output of multiplexer 36 is its 1 input, a "1". Referring to FIGS. 6C and 6D, it can be seen that when X is negative its value is within the clipping limits and no reduction in gain is required. Accordingly, in the regions of FIG. 6D corresponding to those regions of FIG. 6C wherein X is negative, the gain control signal is unity. When the sign bit of X is a zero, indicating a positive value of X, the output of multiplexer 36 is its "0" input, Y, the output of PROM 34. Y, the output of PROM 34, is inversely proportional X, so that the gain control signal is reduced in proportion to how much the X signal is above zero. Thus, the gain control signal in FIG. 6D drops off in both of the regions where X exceeds zero in FIG. 6C, and this reduction in the gain control signal is proportional to how much X is above zero in FIG. 6C.

Referring again to FIG. 4, the signal input is applied to delay element 40 which provides a delay equivalent to the delays associated with all of the circuitry discussed above that operates to produce the gain control signal. The output of delay element 40 is applied to one input of signal reducing means 43. Another input to the signal reducing means 43 is the gain control signal. In the embodiment shown in FIG. 4, the signal reducing means 43 is a mixer 44. However, as will be seen in connection with FIG. 8 below, the signal reducing means 43 can also be a simple multiplier 80' receiving a digital input signal and the gain control signal, and producing a clipped digital signal that is the product of its inputs.

The delayed input signal is applied to the B input of mixer 44. The A input of mixer 44 is the output of multiplexer 42. A thrice delayed version of the sign bit of the adjusted signal controls which input of multiplexer 42 will be its output. The inputs to multiplexer 42 are the constants $K_4$ and $K_5$, defined as follows:

$$K_4 = L_{p.sel} - K_3 \quad (4)$$

$$K_5 = L_{n.sel} + K_3 \quad (5)$$

Using the nominal clipping values shown in FIG. 6A as the selected clipping values and substituting equation (3) into equation (4) produces:

$$K_4 = (L_{p.sel}) - (L_{p.nom} + L_{n.nom})/2 \quad (4a)$$
$$= (120) - (120 + (-10))/2$$
$$= 120 - 55$$
$$= 65$$

Similarly, using the nominal clipping values shown in FIG. 6A as the selected clipping values and substituting equation (3) into equation (5) produces:

$$K_5 = L_{n.sel} + (L_{p.nom} + L_{n.nom})/2 \quad (5a)$$
$$= (-10) + (120 + (-10))/2$$
$$= -10 + 55$$
$$= 45$$

In the example illustrated in FIGS. 6A–6D, the largest excursion past both the selected positive and negative clip limits is 30 IRE units, so $X=30$ at these points. Therefore, the minimum gain control value at both ends of the function shown in FIG. 6D can be calculated as follows using the equation implemented by the PROM:

$$Y = K_3/(K_3 + X) \quad (6)$$

$$K_3 = (L_{p.nom} + L_{n.nom})/2 \quad (3a)$$
$$= (120 + (-10))/2$$
$$= 55$$

$$Y = 55/(55 + 30) \quad (6a)$$
$$= 55/85$$
$$= 0.647$$

The mixer 44 implements the equation:

$$Out_c = A*(1-C)+B*C \quad (7)$$

where the control signal C is the gain control signal, B is the delayed signal input and A is $K_4$ when the sign bit of the current value is a zero indicating that the current value is positive, and $K_5$ when the sign bit of the current value is a one indicating that the current value is negative.

Thus, the calculation for the case at the extreme left of the graphs shown in FIGS. 6A–6D is:

$$Out_c = A*(1-C) + B*C \quad (7a)$$
$$= 45*(1 - 0.647) + 0.647*(-40)$$
$$= -10$$

This is the desired result since the selected negative clipping limit was assumed to be the same as the nominal clipping limit and it was $-10$.

And, the calculation for the case at the extreme right of the graphs shown in FIGS. 6A–6D is:

$$Out_c = A*(1-C) + B*C \quad (7b)$$
$$= 65*(1 - 0.647) + 0.647*(150)$$
$$= 120$$

Figure 6E:
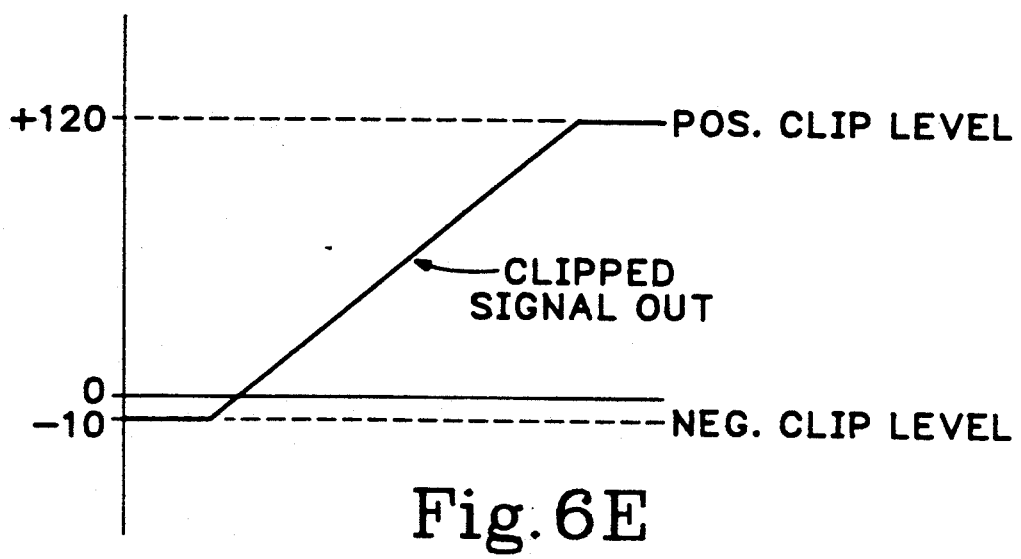
Figure 7:
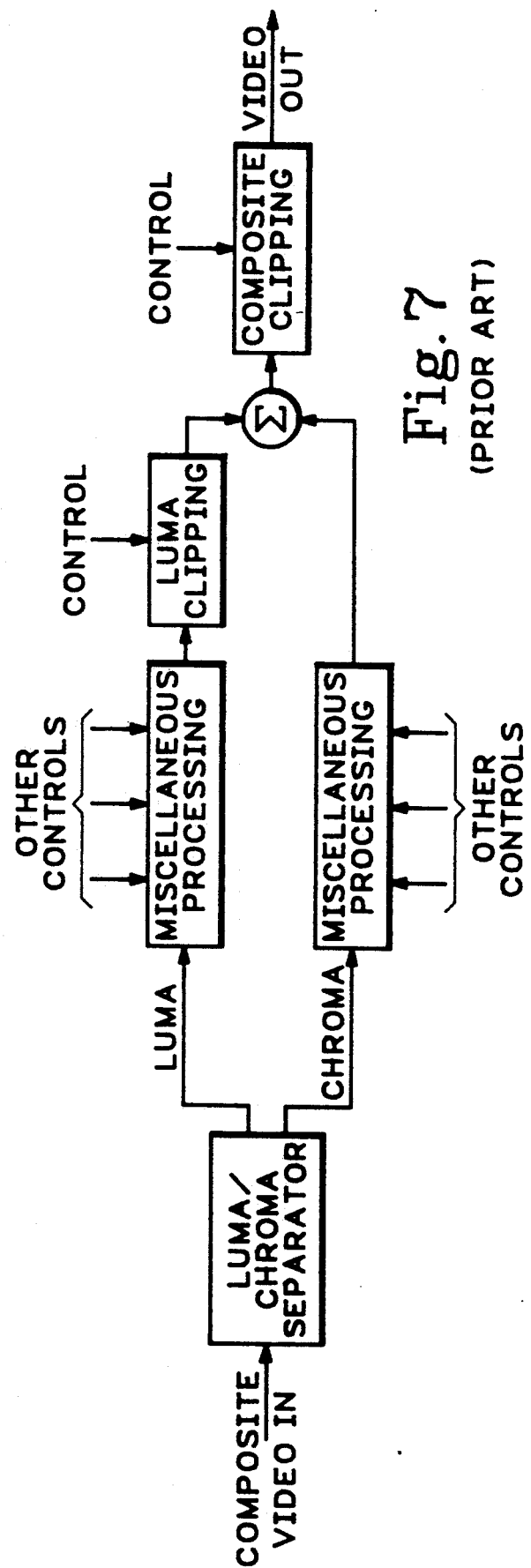
FIG. 7 is a block diagram of a video processing amplifier according to the prior art.

And again, this is the desired result since the selected positive clipping limit was assumed to be the same as the nominal clipping limit and it was $+120$. The results of the clipping process illustrated in FIGS. 6A–6D are shown in FIG. 6E.

In the foregoing example, it was assumed that the selected clipping limits were the same as the nominal clipping limits. From the following algebraic manipulations, it can be seen that the same results are obtained when the selected positive clip limit is different than the nominal positive clip limit. We start with the equation for the clipped output:

$$Out_c = A*(1-C)+B*C \quad (7)$$

For signals that are nearer to the selected positive clipping limit than to the selected negative clipping limit, A is equal to $K_4$, and the right side of equation (4) can be substituted for A in equation (7) Equation (8) can then be rearranged as follows:

$$Out_c = (L_{p.sel} - K_3)*(1 - C) + B*C \quad (8)$$
$$= L_{p.sel} - K_3 - C*L_{p.sel} + C*K_3 + B*C$$
$$= C*(K_3 + B - L_{p.sel}) + L_{p.sel} - K_3$$

Noting that C is the PROM output, Y, when it isn't "1", the right side of equation (5) can be substituted for C in equation (8) to obtain:

$$Out_c = \frac{K_3}{K_3 + X} * (K_3 + B - L_{p.sel}) + L_{p.sel} - K_3 \quad (9)$$

Since the X signal is the amount that the input signal, which is B in equation (8), exceeds the selected positive clipping limit, $L_{p.sel}$, the quantity B minus $L_{p.sel}$ can be substituted for X in equation (9)

$$Out_c = \frac{K_3}{(K_3 + B - L_{p.sel})} * (K_3 + B - L_{p.sel}) + L_{p.sel} - K_3 \quad (10)$$
$$= L_{p.sel}$$

Thus, cancellation reveals that the output of mixer 44 will always be equal to the selected positive clipping limit whenever the gain control signal has a value less than one and the input signal is closer to the selected positive clipping limit than it is to the selected negative clipping limit.

It can be similarly shown that the output of mixer 44 is equal to the selected negative clipping limit when the input signal is closer to the selected negative clipping limit than it is to the selected positive clipping limit. Thus, whenever the gain control signal has a value less than one, the output of mixer 44 is equal to the selected clipping limit.

The interpolating digital signal clipping circuit 50 shown in FIG. 4 can be used to clip any digital signal. However, for video signals, which contain both luminance and chrominance components, a more specialized digital video clipping circuit is shown in FIG. 8. In this circuit the luminance and chrominance components are clipped separately before they are combined, but they are clipped based on an analysis of how large they will be after they are combined. The clipping is distributed between the luminance and chrominance channels, so that neither signal is clipped excessively The circuit shown in FIG. 8 receives a luminance input and two chrominance inputs, A and B, which could be I and Q in NTSC systems or U and V in PAL systems. The luminance signal is applied to the input of a luminance clipper 50', such as that shown in FIG. 4 and described above.

Figure 1:
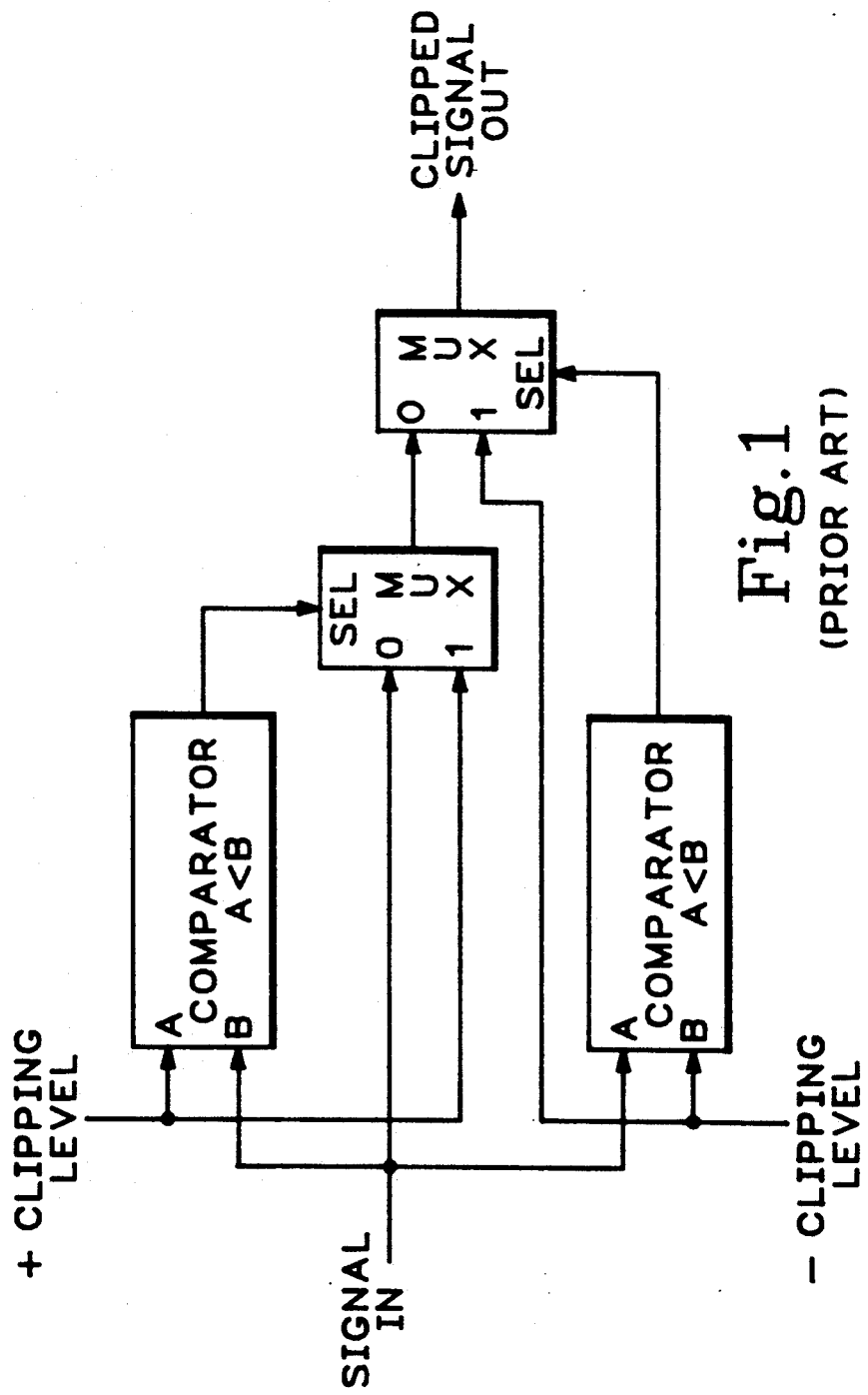
FIG. 1 is block diagram of a prior art digital clipping circuit.
Figure 2A:
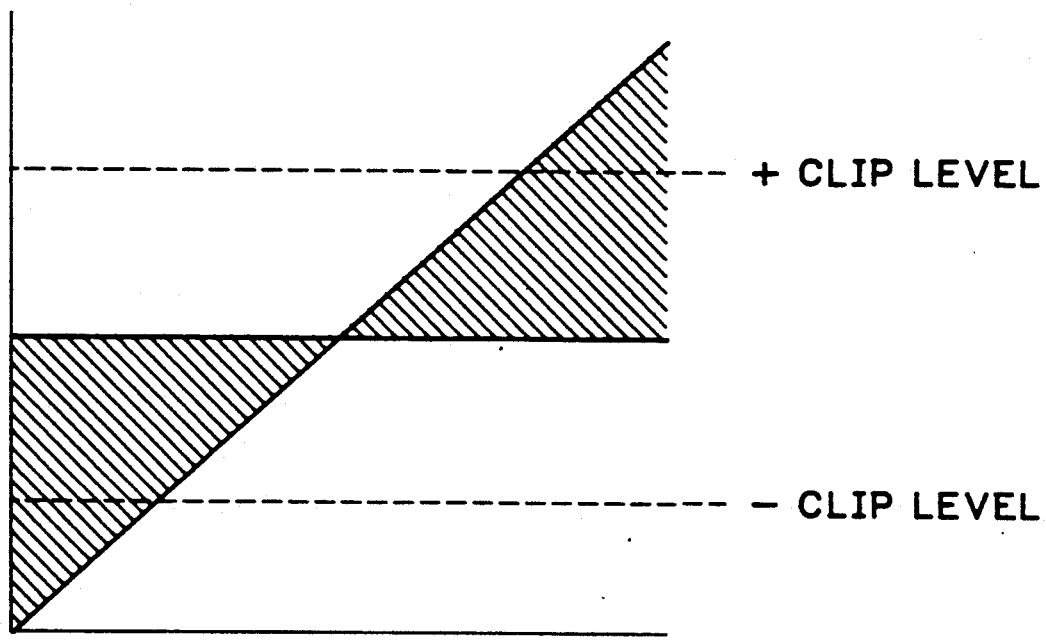
FIGS. 2A and 2B show an input signal and an output signal that has been clipped.
Figure 2B:
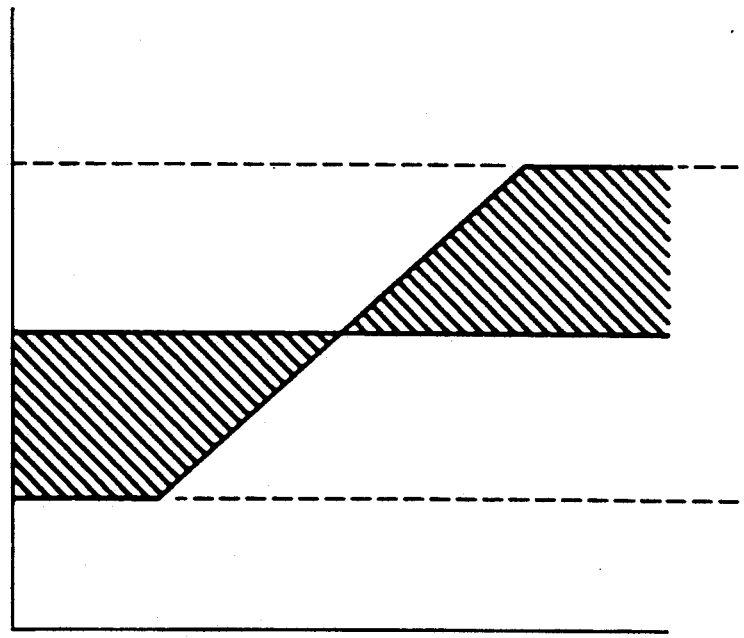
Figure 3A:
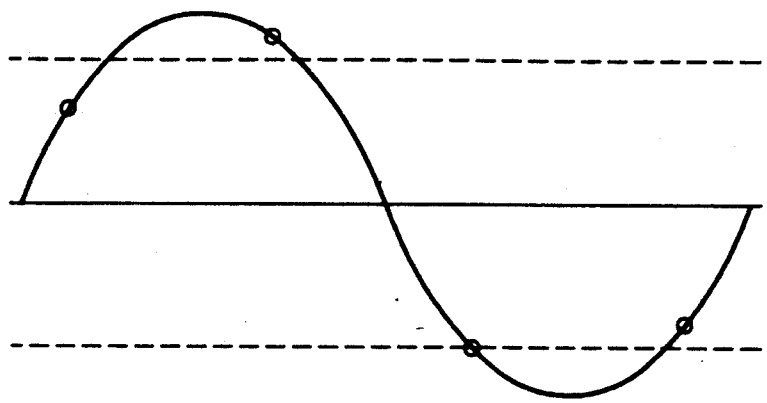
FIGS. 3A–3C illustrate how digital clipping of a signal can be frustrated by signal frequencies that approach one half of the sampling frequency.
Figure 3B:
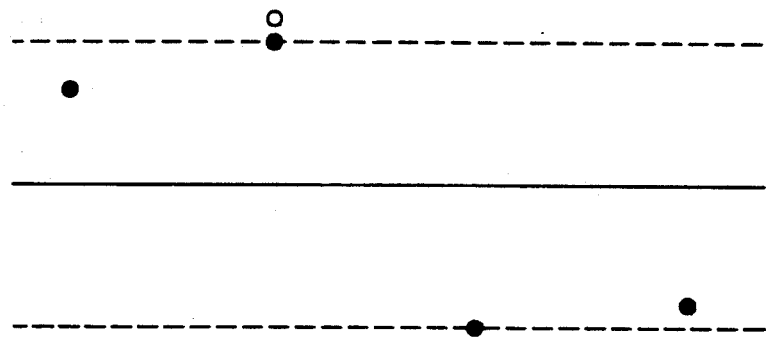
Figure 3C:
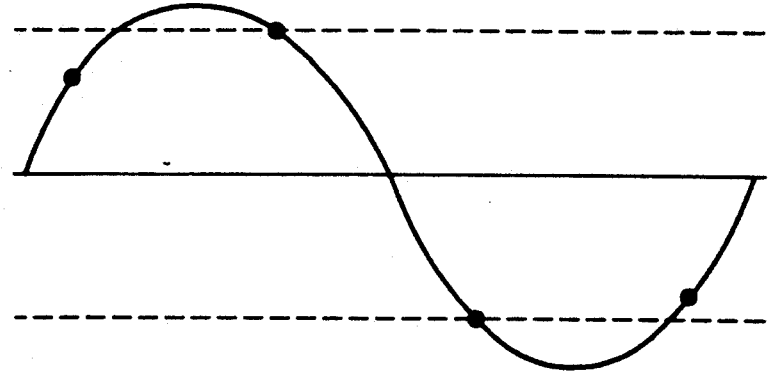

It should be noted that the circuit shown in FIG. 8 can use a conventional (prior art) clipping circuit as shown in FIG. 1 in lieu of the novel circuit shown in FIG. 4, but then the output would be susceptible to the problem illustrated in FIGS. 3A-3C when the clipping of high frequency signals is required. Therefore, the preferred implementation utilizes the circuit shown in FIG. 4 as the luminance clipper 50'.

While the luminance channel can benefit from using the clipping circuit shown in FIG. 4, the chrominance channel is sufficiently lower in frequency so as not to encounter the under-sampling problems experienced in the luminance channel, and it is therefore not efficient to provide the more costly interpolating clipping circuit for the chrominance channel too.

Figure 9A:
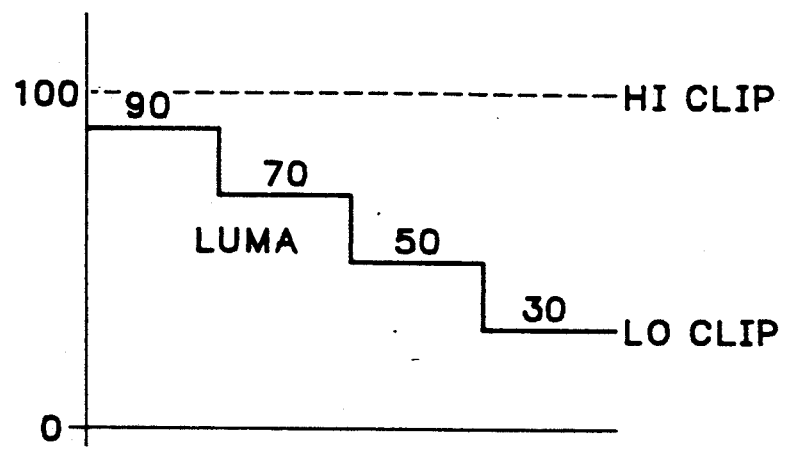
Figure 9B:
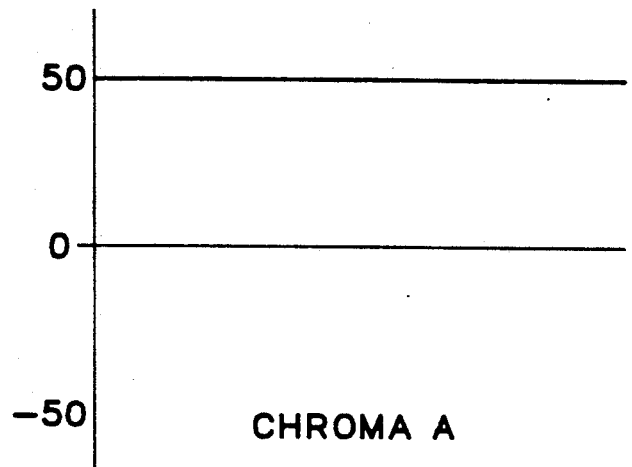
Figure 9C:
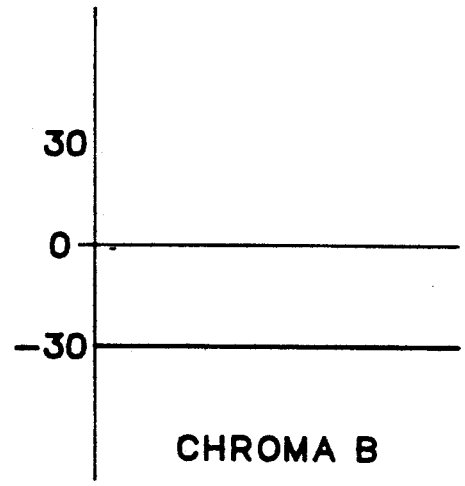

As an example, FIGS. 9A, 9B and 9C show a luminance signal input and two chrominance component inputs, A and B. If these are assumed to be NTSC signals at the levels shown, with a luminance value that varies from +90 to +30 IRE, and A is an I signal with a value of +50, and B is a Q signal with a value of −30, the resulting image is a yellow color with a brightness that decreases in steps. This is an example of a fairly saturated hue, and the brightest and dimmest portions of this signal will require clipping to be within the nominal composite clipping values of +120 and −20 that will be assumed. FIG. 9A represents both the input and output of the luminance clipper 50', since the assumed clipping limits are now +100 and 0 and the luminance signal only has values that are within that range.

Referring again to FIG. 8, the chrominance A component is applied to both inputs of multiplier 64 to produce a chroma.$A^2$ signal at the output. The chrominance B component is applied to both inputs of multiplier 66 to produce a chroma.$B^2$ signal. The outputs of the two multipliers, 64 and 66, are applied to the inputs of summing circuit 68 which adds them to produce the sum of the squares of the chrominance components A and B, chroma.$A^2$+chroma.$B^2$. This signal is applied to the input of PROM 70 which implements the square root function to produce a signal indicative of the absolute value of the magnitude of the chrominance signal, or chroma magnitude. In the example shown in FIGS. 9B, 9C and 9E, the chroma magnitude is a constant having the value 58.3, this being the square-root of the sum of $50^2$ and $-30^2$. The chroma magnitude signal is applied to the B input of ALU 54.

Figure 9D:
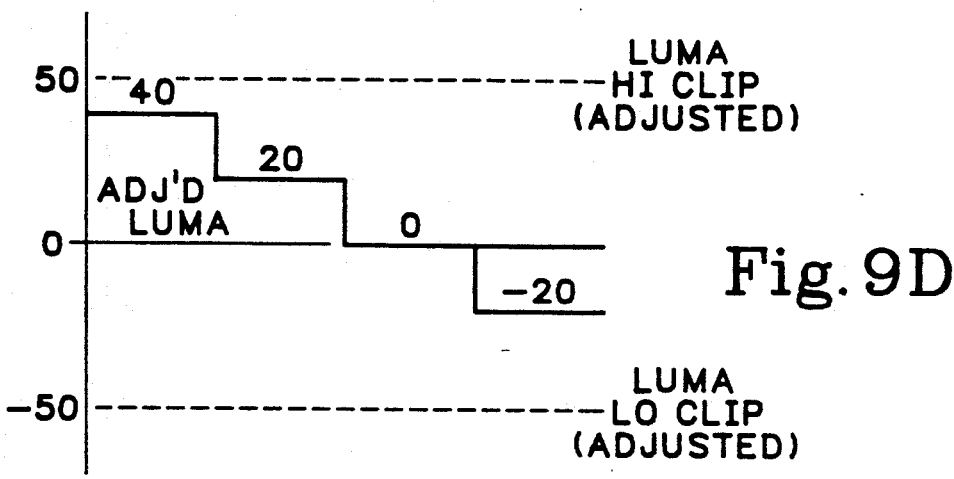
Figure 9E:
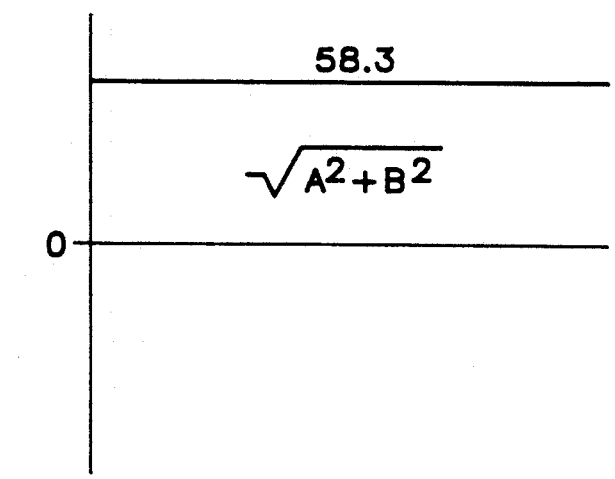

The output of the luminance clipper 50' is applied to a plus input of summing circuit 52, which also receives a constant, $K_1$, on its minus input. The output of summing circuit 52 is an adjusted luminance signal, as shown in FIG. 9D. $K_1$ is 50, one half of the sum of the selected positive and negative composite clipping limits, 120 and −20. The adjusted clipped luminance signal has the same properties as the adjusted signal described above in connection with FIG. 4, i.e., being centered around zero, with zero being at the middle of the clipping range. The output of summing circuit 52 is applied to the A input of ALU 54, which implements either the function A+B or the function A−B, depending on the whether its control input, C, is a zero or a one, respectively. The control signal C is the sign bit of the adjusted luminance signal. The effect of this is to add the chroma magnitude signal to the adjusted luminance signal if the adjusted luminance signal is positive and therefore closer to the selected positive clipping limit than it is to the selected negative clipping limit, or to subtract the chroma magnitude signal from the adjusted luminance signal if the adjusted luminance signal is closer to the selected negative clipping limit than it is to the selected positive clipping limit.

Figure 9F:
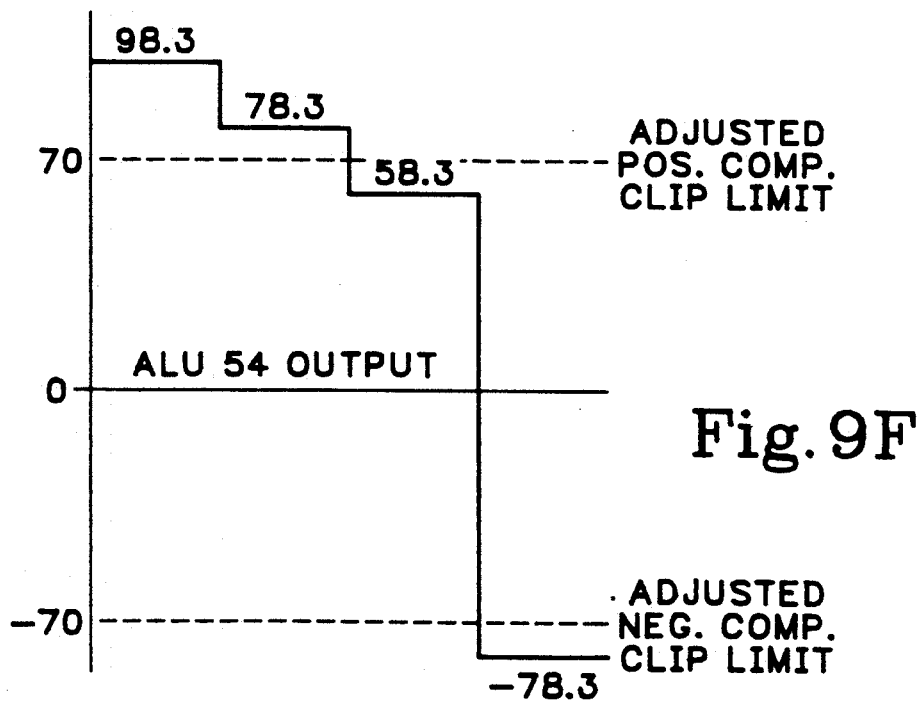

The output of ALU 54 for the yellow example started above is shown in FIG. 9F. The first three values of adjusted luminance shown in FIG. 9D were 40, 20 and 0. Each of these has the output of PROM 70 shown in FIG. 9E added to it by ALU 54 to produce the values of 98.3, 78.3 and 58.3 seen in FIG. 9F. The fourth adjusted luminance value shown in FIG. 9D is −20. Because this changes the sign bit of the output of summing circuit 52 to a one, ALU 54 subtracts the chroma magnitude value of 58.3 from −20 to get the −78.3 shown in FIG. 9F.

Also visible in FIG. 9F are the adjusted positive and negative composite clipping limits, 70 and −70. These reflect the assumption that a positive composite clipping limit of +120 and a negative clipping limit of −20 have been selected. Using these numbers in a variation of equation (1) produces:

$$K_1 = (L_{p.sel.comp} + L_{n.sel.comp})/2 \qquad (1.1)$$
$$= (120 + (-20))/2$$
$$= 50$$

where $L_{p.sel.comp}$ is the selected positive composite clipping limit and $L_{n.sel.comp}$ is the selected negative composite clipping limit.

Subtracting this adjustment constant from each clipping limit produces the adjusted composite clipping limits shown in FIG. 9F, i.e., +70 and −70.

The output of ALU 54 is applied to the A input of ALU 56. The B input to ALU 56 is the constant $K_2$. ALU 56 implements the function A+B when its control input C is high, or the function B−A when the control input C is low. The control input C to ALU 56 is the sign bit of the output of ALU 56. Recalling equation (2) above, and assuming the composite clip limits +120 and −20, it can be seen that $$K_2 = -(L_{p.sel.comp} - L_{n.sel.comp})/2 \qquad (2b)$$
$$= -(120 - (-20))/2$$
$$= -70$$

Figure 9G:
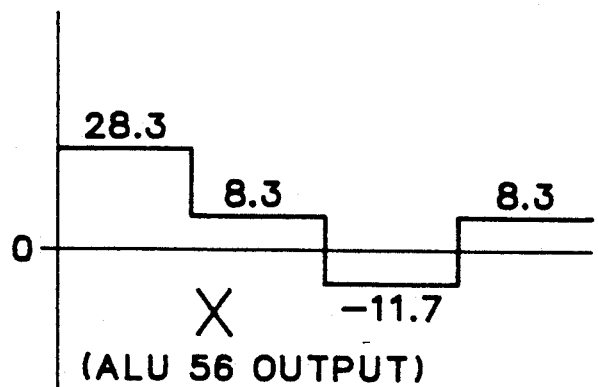

The output of ALU 56, X, is shown in FIG. 9G, and represents the amount that the composite video envelope exceeds either the selected positive or negative clipping limits. For the first parts of the ALU 54 output shown in FIG. 9F, the sign bit is positive and ALU 56 implements A+B, or A+(−70), for A values of 98.3, 78.3 and 58.3, producing X value outputs of 28.3, 8.3 and −11.7 shown in FIG. 9G. For the fourth part of the ALU 54 output shown in FIG. 9F, the sign bit is negative and ALU 56 implements B−A, or (−70)−(−78.3), producing the X value of 8.3 seen in the last part of FIG. 9G.

The output of ALU 56, X, is used to address PROM 58 which produces its output Y by implementing the function $Y = K_3(K_3 + X)$, where $K_3$ is defined by equation (3) above using the nominal composite clipping values For nominal composite clipping values of +120 and −20, $K_3$ is:

$$K_3 = (L_{p.nom.comp} + L_{n.nom.comp})/2 \qquad (3.1)$$
$$= (120 + (-20))/2$$
$$= 50$$

where $L_{p.nom.comp}$ is the nominal positive composite clipping limit and $L_{n.nom.comp}$ is the nominal negative composite clipping limit.

Therefore when X is 28.3, the output of PROM 58, Y, is calculated as follows:

$$Y = K_3/(K_3 + X) \quad (6b)$$
$$= 50/(50 + 28.3)$$
$$= 50/78.3$$
$$= 0.64$$

A similar calculation shows that the Y value associated with the X value 8.3 is 0.86. These Y values are selected as the multiplexer 60 output when the sign bit of X is a zero indicating that X is positive. When X is negative and its sign bit is a one, the "1" input to multiplexer 60 is selected as its output. The X values shown in FIG. 9G produce the gain control signal levels shown in FIG. 9H. The gain control signal is filtered by (optional) low-pass filter 61 to prevent instantaneous gain changes that could result in aliasing. Low-pass filter 61 preferably has a symmetrical response time of approximately one to two sample periods.

Mixer 74 implements the equation:

$$LumaOut_{clipped} = AC + B*(1-C) \quad (11)$$

where the control signal C is the gain control signal, A is the luminance input delayed by delay element 62 and B is $K_4$ when the sign bit of the current value is a zero indicating that the current value is positive and $K_5$ when the sign bit of the current value is a one indicating that the current value is negative.

In the digital video signal clipping circuit shown in FIG. 8, the constants $K_4$ and $K_5$ represent two gray values that are mixed with the luminance signal to moderate extremes of black or white and move the resulting clipped luminance signal toward a more gray value.

Using the nominal positive composite clipping value as the selected value and substituting equation (3) into equation (4) produces:

$$K_4 = L_{p.sel.comp} - (L_{p.nom.comp} + L_{n.nom.comp})/2 \quad (4.1a)$$
$$= (120) - (120 + (-20))/2$$
$$= 120 - 50$$
$$= 70$$

Similarly, using the nominal negative composite clipping value as the selected value and substituting equation (3) into equation (5) produces $$K_5 = L_{n.sel.comp} - (L_{p.nom.comp} + L_{n.nom.comp})/2 \quad (5.1a)$$
$$= (-20) + (120 + (-20))/2$$
$$= -20 + 50$$
$$= 30$$

Figure 9H:
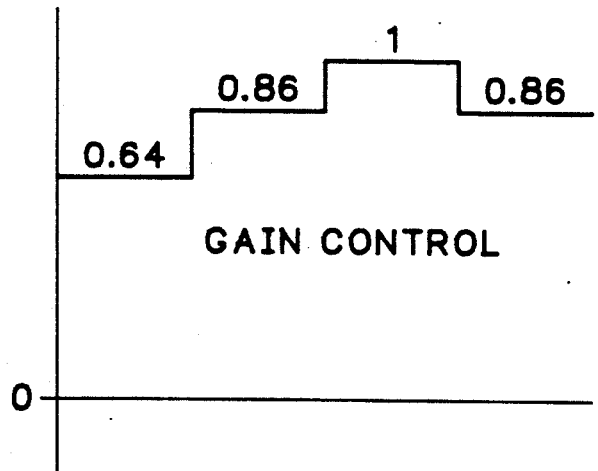
Figure 9I:
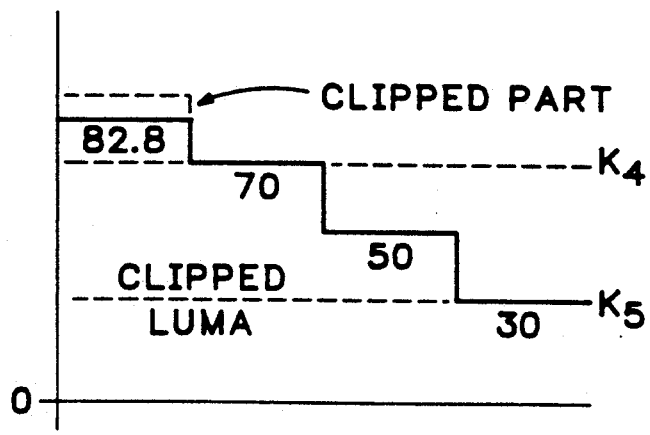

Thus, the calculation for the level in FIG. 9I that corresponds to the first level at the left of in FIG. 9H is:

$$LumaOut_{clipped} = A*C + B*(1-C) \quad (11a)$$
$$= 90*0.64 + 70*(1 - 0.64)$$
$$= 82.8$$

And, the calculations for the levels in FIG. 9I that correspond to the second and fourth levels in FIG. 9H are:

$$LumaOut_{clipped} = A*C + B*(1-C) \quad (11b)$$
$$= 70*0.86 + 70*(1 - 0.86)$$
$$= 70$$

$$LumaOut_{clipped} = A*C + B*(1-C) \quad (11c)$$
$$= 30*0.86 + 30*(1 - 0.86)$$
$$= 30$$

It can be seen from FIG. 9I that only the first luminance level was actually clipped by this process. The other two levels were not clipped because they already had values as low as the corresponding $K_4$ and 5 values. The third level passed through mixer 74 while C was a "1" and no mixing occurred (because the right side of equation (11) reduces to A when C=1).

The output of mixer 74, the clipped luminance signal, is available directly as an output, but it is also applied to one input of combiner 82, where it is mixed with the clipped chrominance signal to produce a clipped composite signal.

The clipping of the chrominance signal will now be discussed. Chroma.B is delayed by delay element 78 and applied to an input of signal reducing means 43, which in this embodiment includes multiplier 80. Chroma.A is delayed by delay element 79 and applied to another input of the signal reducing means 43, which in this embodiment includes multiplier 81. The other input to both multipliers, 80 and 81, is the gain control signal.

FIGS. 9J and 9K show the outputs of multipliers 80 and 81, respectively. The gain values calculated above, 0.64, 0.86, 1.00 and 0.86, for the four time intervals (corresponding to the different luminance levels) have been applied to the chrominance components B and A to produce the outputs seen in FIGS. 9J and 9K, respectively. These clipped chroma.B and chroma.A components are provided directly as outputs to the exterior of this circuit, and are also provided to combiner circuit 82 which also receives the clipped luminance signal.

For simplicity, FIGS. 9J and 9K showed the chrominance components is being constant in sign, rather than alternating in sign every other pixel. FIG. 9L shows the envelope created by the chrominance magnitude signal that results after the chroma.A and chroma.B components have been individually clipped. The values shown in this Figure are those obtained by taking the square root of the sums of the squares of the corresponding regions in FIGS. 9J and 9K.

Combiner 82 produces the clipped composite video signal output that appears as shown in FIG. 9M. This clipped composite video signal is produced by adding phase alternating versions of the clipped chroma A and B components shown in FIGS. 9J and 9K to the clipped luminance signal shown in FIG. 9I. The chroma components that are added alternate between A and B and —A and —B to produce the envelope shown when their resultant alternating magnitudes are impressed on the luminance levels shown in FIG. 9I. For example, the first chroma.B level shown in FIG. 9J is −19.2, the square of which is 368.6. The corresponding chroma.A level in FIG. 9K is 32, the square of which is 1024. The sum of these values is 1392.6, and the square root of that value is 37.3, as shown in FIG. 9L. When that clipped chrominance magnitude is added to the clipped luminance level of 8.28 shown in FIG. 9I, the results, +120 and +45.6, are shown in the first region of FIG. 9M. Similar desirable results appear in the other three regions of FIG. 9M.

As can be seen from the foregoing example, the digital video clipping circuit produces clipped composite video in which the clipping has been allocated between the luminance component and both of the chrominance components. How much clipping occurs on the luminance component depends on the value of the gain control signal and the values of $K_4$ and $K_5$, which in turn depend on the selected clipping limits and the value of $K_3$:

$$K_4 = L_{p.sel.comp} - K_3 \qquad (4.1)$$

$$K_5 = L^{n.sel.comp} + K^3 \qquad (5.1)$$

How much clipping occurs on the chrominance components depends on the gain control signal, which in turn depends on the value of $K_3$. The value of $K_3$ depends on the nominal clipping limits:

$$K_3 = (L_{p.nom.comp} + L_{n.nom.comp})/2 \qquad (3.1)$$

It should be noted that the allocation of clipping between luminance and chrominance components can be altered by altering $K_3$. For instance, in the example above, if $K_3$ is increased by 10, from 50 to 60, and the calculations are repeated for the four X values, 28.3, 8.3, −11.7 and 8.3, the result is more luminance clipping and less chrominance clipping, as shown in the table below. A $K_3$ change of plus ten is equivalent to a change in the nominal composite clipping limits from the +120, −20 to +120, 0:

$$\begin{aligned} K_3 &= (L_{p.nom.comp} + L_{n.nom.comp})/2 \qquad (3.1a) \\ &= (120 + 0)/2 \\ &= 60 \end{aligned}$$

Using this alternative $K_3$ value leads to increased luminance clipping and decreased chrominance clipping:

| COMPARATIVE CALCULATIONS SHOWING EFFECT OF CHANGING $K_3$ | | |
|---|---|---|
| Constant/ Variable | Previous Value | Current Value |
| $K_3$ | 50 | 60 |
| Gain Ctrl.1 | 0.64 | 0.68 |
| Gain Ctrl.2 | 0.86 | 0.88 |
| Gain Ctrl.3 | 1.00 | 1.00 |
| Gain Ctrl.4 | 0.86 | 0.88 |
| $K_4$ | 70 | 60 |
| $K_5$ | 30 | 40 |
| Luma Clip.1 | 82.8 | 80.04 |
| Luma Clip.2 | 70 | 68.08 |
| Luma Clip.3 | 50 | 50 |
| Luma Clip.4 | 30 | 31.02 |
| Chroma.A.1 | 32 | 34 |
| Chroma.B.1 | −19.2 | −20.04 |
| Chroma.A.2 | −43 | −44 |
| Chroma.B.2 | 25.8 | 26.04 |
| Chroma.A.3 | 50 | 50 |
| Chroma.B.3 | −30 | −30 |
| Chroma.A.4 | −43 | −44 |
| Chroma.B.4 | 25.8 | 26.04 |

For ease of illustration and because it might be desirable in some applications to have separate clipped chroma.A and clipped chroma.B outputs, the chroma.A and chroma.B channels have been shown in FIG. 8 as separate channels until they are combined within combiner 82. However, to save parts, chroma.A and chroma.B could be multiplexed together earlier, eliminating the need for one of the delay elements 78 or 79 and one of the multipliers 80 or 81.

FIG. 10 shows this alternative chrominance signal reduction circuitry. The chroma.A and chroma.B signals are multiplexed by multiplexer 75 according to a select signal operating a twice the frequency of the sub-carrier. The resulting multiplexed chrominance signal is then delayed by delay element 76 to compensate for the delays experienced in the generation of the gain control signal. The output of delay element 76 is applied to one input of signal reducing means 43''', whose other input is the gain control signal. In this implementation, the signal reducing means 43''' is multiplier 77. The output of multiplier 77 is a clipped chrominance signal which is made available directly as an output of the video clipping circuit and also applied to one of the inputs of combiner 82'. The other input to the combiner 82' is the clipped luminance signal, and the output of the combiner 82' is a clipped composite video signal.

While a preferred embodiment of the present invention has been shown and described, it will be apparent to those skilled in the art that many changes and modifications may be made without departing from the invention in its broader aspects.

For example, while the implementations shown in FIGS. 4 and 8 both adjust the input signals by $K_1$ to center the clipping range around zero, alternatives are envisioned in which the clipping range is adjusted such that its center is mid-range within some power of two number so that the most significant bit (MSB) of that number changes state as the adjusted signal crosses through the center of the clipping range. In this case, "sign bit" in FIGS. 4 and 8 would be replaced by "MSB", and this "indicating bit" would perform the same function as the sign bit did in the above discussions. Either approach leads to the same ability to "fold over" the clipping range and uses one set of hardware instead of two to do both the positive and negative clipping.

The claims that follow are therefore intended to cover all such changes and modifications as fall within the true scope of the invention.

I claim:

1. An interpolating clipping circuit for a sampled signal, comprising:

means for adjusting each sample of an input signal so that when an indicating bit of a current sample is in a first state the current sample is closer to a positive clipping limit and when the indicating bit is in a second state the current sample is closer to a negative clipping limit;

interpolation means for receiving adjusted samples of the input and producing a plurality of interpolated samples;

minimum or maximum selecting means for selecting which sample among the interpolated samples or the current sample is the minimum or maximum depending on whether the indicating bit is in the second state or the first state, respectively;

means for determining when and by how much the selected minimum sample exceeds the negative clipping limit or the selected maximum sample exceeds the positive clipping limit to produce an excess signal;

means for converting the excess signal to a gain control signal that is dependent on the excess signal when the excess signal is positive and is independent of the excess signal when the excess signal is negative; and means for reducing the input signal according to the gain control signal to produce a clipped output signal.

2. An interpolating digital signal clipping circuit according to claim 1, wherein the means for adjusting comprises:

a summing circuit receiving the samples of the input signal on a positive input and a constant on a negative input and producing adjusted samples, the constant being one half of the sum of the positive clipping limit and the negative clipping limit, the summing circuit producing adjusted samples, the indicating bit of the adjusted samples being a zero when the adjusted sample is closer to the positive clipping limit and a one when the adjusted sample is closer to the negative clipping limit.

3. An interpolating digital signal clipping circuit according to claim 1, wherein the interpolation means comprises:

a delay element receiving a current sample and producing a delayed version of the current sample;

a plurality of phase shifting filters each receiving the previous sample and the current sample and producing phase delayed samples, the phase delayed samples associated with the current sample being delayed interpolated samples; and a plurality of registers each receiving the output of one of the plurality of phase shifting filters, the registers being clocked at a sample rate and producing phase delayed samples further delayed by one sample period, the further delayed phase delayed samples associated with the previous sample being advanced interpolated samples.

4. An interpolating digital signal clipping circuit according to claim 1, wherein the means for determining comprises:

an arithmetic unit that implements a first function A plus B or a second function B minus A, depending on whether the indicating bit of a delayed current sample is in the first state or the second state, respectively, A being the selected minimum sample or the selected maximum sample and B being a constant equal to negative one half of the difference produced by subtracting the negative clipping limit from the positive clipping limit, the result of the implementation of the function being the excess signal.

5. A n interpolating digital signal clipping circuit circuit according to claim 1, wherein the means for converting comprises:

a memory addressed by the excess signal and implementing the function K/(K+X), where K is nominally one half of the sum of a nominal positive clipping limit and a nominal negative clipping limit and X is the excess signal, the output of the memory being a reduced gain signal; and a multiplexer having as one input the value "1" and having as another input the reduced gain signal, and having as a select control input a sign bit of the excess signal, the multiplexer selecting as the gain control signal the "1" input when the excess signal is negative and the reduced gain signal when the excess signal is positive.

6. An interpolating digital signal clipping circuit according to claim 5, wherein the means for reducing comprises:

a delay element receiving the input signal and producing a delayed input signal; and a mixer having as one input a gray signal and as the other input the delayed input signal, the mixer mixing these inputs according to the gain control signal and a mixing function to produce the clipped output signal.

7. An interpolating digital signal clipping circuit according to claim 6, wherein the means for reducing further comprises:

a multiplexer whose output is the gray signal and whose inputs are a first gray signal and a second gray signal, the first gray signal being the positive clipping limit minus K, the second gray signal being the negative clipping limit plus K, the first gray signal being selected when a delayed version of the indicating bit of a delayed current sample is in the first state and the second gray signal being selected when the indicating bit of the delayed current sample is in the second state.

8. AN interpolating digital signal clipping circuit according to claim 1, wherein the means for reducing comprises:

a multiplier receiving the input signal and the gain control signal as inputs and producing a clipped output.

9. A digital video signal clipping circuit, comprising:

means for adjusting each sample of an input luminance signal so that when an indicating bit of an adjusted luminance sample is in a first state the adjusted luminance sample is closer to a positive clipping limit and when the indicating bit is in a second state the adjusted luminance sample is closer to a negative clipping limit;

means for calculating a chrominance magnitude from a chroma A component input and a chroma B component input;

means for producing a composite magnitude signal from the adjusted luminance samples and the chrominance magnitude;

means for determining when and by how much the composite magnitude signal exceeds the negative clipping limit or the positive clipping limit and producing an excess signal containing that information;

means for converting the excess signal to a gain control signal that is dependent on the excess signal when the excess signal is positive and is independent of the excess signal when the excess signal is negative; and means for diminishing the input luminance signal, the chroma A component input and the chroma B component input according to the gain control signal to produce a clipped video output.

10. A digital video signal clipping circuit according to claim 9, further comprising:

luminance clipping means for clipping the input luminance signal before the input luminance signal is received by the means for adjusting.

11. A digital video signal clipping circuit according to claim 10, wherein the luminance clipping means is an interpolating digital signal clipping circuit comprising:

means for adjusting each sample of an input signal so that when an indicating bit of a current sample is in a first state the current sample is closer to a positive clipping limit and when the indicating bit is in a second state the current sample is closer to a negative clipping limit;

interpolation means for receiving adjusted samples of the input signal and producing a plurality of interpolated samples;

minimum or maximum selecting means for selecting which sample among the interpolated samples or the current sample is the minimum or maximum depending on whether the indicating bit is in the second state or the first state, respectively;

means for determining when and by how much the selected minimum sample exceeds the negative clipping limit or the selected maximum sample exceeds the positive clipping limit to produce an excess signal;

means for converting the excess signal to a gain control signal that is dependent on the excess signal when the excess signal is positive and is independent of the excess signal when the excess signal is negative; and means for reducing the input signal according to the gain control signal to produce a clipped output signal.

12. A digital video signal clipping circuit according to claim 9, wherein the means for adjusting comprises:

a summing circuit having as a plus input the input luminance signal and as a minus input a constant, the constant being one half of the sum of the positive clipping limit and the negative clipping limit, the summing circuit producing an adjusted luminance signal output, the sign indicating bit of the adjusted luminance signal being a zero when the adjusted luminance signal is closer to the positive clipping limit and a one when the adjusted luminance signal is closer to the negative clipping limit.

13. A digital video signal clipping circuit according to claim 9, wherein the means for producing comprises:

means for performing A+B when the indicating bit is in the first state and A−B when the indicating bit is in the second state, A being the adjusted luminance sample and B being the chrominance magnitude, to produce the composite magnitude.

14. A digital video signal clipping circuit according to claim 9, wherein the means for determining produces the excess signal by implementing a first function A+B if a control bit is a one or a second function B−A if the control bit is a zero, A being the composite magnitude output of the means for producing, B being a constant that is minus one half of the difference between the positive clipping limit and the negative clipping limit, and the control bit being the sign of the composite magnitude signal.

15. A digital video signal clipping circuit according to claim 14, wherein the means for converting comprises:

a memory addressed by the excess signal and implementing the function K/(K+X), where K is about one half of the sum of a nominal positive clipping limit and a nominal negative clipping limit and X is the excess signal, the output of the memory being a reduced gain signal; and a multiplexer having as a first input the value "1" and having as a second input the reduced gain signal, the multiplexer being controlled by the excess signal to produce the first input as a gain control output when the excess signal is negative and the second input as the gain control output when the excess signal is positive.

16. A method for performing interpolated clipping of a sampled signal, the method comprising the steps of:

adjusting each sample of an input signal so that when an indicating bit of a current sample is in a first state the current sample is closer to a positive clipping limit and when the indicating bit is in a second state the current sample is closer to a negative clipping limit;

interpolating between adjusted samples of the input signal to produce a plurality of interpolated samples;

selecting which sample among the interpolated samples or a current sample is the minimum or maximum depending on whether the indicating bit is in the second state or the first state, respectively;

determining when and by how much the selected minimum sample exceeds the negative clipping limit or the selected maximum sample exceeds the positive clipping limit to produce an excess signal;

converting the excess signal to a gain control signal that is dependent on the excess signal when the excess signal is positive and is independent of the excess signal when the excess signal is negative; and reducing the input signal according to the gain control signal to produce a clipped output signal.

17. A method for performing interpolated clipping according to claim 16, wherein the adjusting step comprises the steps of:

summing the samples of the input signal and a constant to produce adjusted samples, the constant being one half of the sum of the positive clipping, limit and the negative clipping limit, the indicating bit of the adjusted samples being a zero when the adjusted sample is closer to the positive clipping limit and a one when the adjusted sample is closer to the negative clipping limit.

18. A method for performing interpolated clipping according to claim 16, wherein the interpolating step comprises the steps of:

delaying a current sample to produce a delayed current sample;

phase shifting each of a previous sample and the current sample to produce phase delayed samples, the phase delayed samples associated with the current sample being delayed interpolated samples; and holding each phase delayed sample to produce phase delayed samples further delayed by one sample period, the further delayed phase delayed samples associated with the previous sample being advanced interpolated samples.

19. A method for performing interpolated clipping according to claim 16, wherein the determining step comprises the step of:

implementing a first function A plus B or a second function B minus A, depending on whether the indicating bit of a delayed current sample is in the first state or the second state, respectively, A being the selected minimum sample or the selected maximum sample and B being a constant equal to negative one half of the difference produced by subtracting the negative clipping limit from the positive clipping limit, the result of the implementation of the function being the excess signal.

20. A method for performing interpolated clipping according to claim 16, wherein the converting step comprises the steps of:
- addressing a memory with the excess signal to implement the function $K/(K+X)$, where K is about one half of the sum of a nominal positive clipping limit and a nominal negative clipping limit and X is the excess signal, the output of the memory being a reduced gain signal; and
- selecting between the value "1" and the reduced gain signal according to a sign bit of the excess signal to produce the gain control signal, so that when the sign bit indicates that the excess signal is negative the "1" is selected and when the sign bit indicates that the excess signal is positive the reduced gain signal is selected.

21. A method for performing interpolated clipping according to claim 20, wherein the reducing step comprises the steps of:
- delaying the input signal to produce a delayed input signal; and
- mixing a gray signal and the delayed input signal according to the gain control signal and a mixing function to produce the clipped output signal.

22. A method for performing interpolated clipping according to claim 21, wherein the reducing step further comprises the step of:
- selecting as the gray signal either a first gray signal or a second gray signal, the first gray signal being the positive clipping limit minus K, the second gray signal being the negative clipping limit plus K, the first gray signal being selected when a delayed version of the indicating bit of a delayed current sample is in the first state and the second gray signal being selected when the indicating bit of the delayed current sample is in the second state.

23. A method for performing interpolated clipping according to claim 16, wherein the reducing step comprises the step of:
- multiplying the input signal and the gain control signal to produce a clipped output.

24. A method for clipping a digital video signal, the method comprising the steps of:
- adjusting each sample of an input luminance signal so that when an indicating bit of an adjusted luminance sample is in a first state the adjusted luminance sample is closer to a positive clipping limit and when the indicating bit is in a second state the adjusted luminance sample is closer to a negative clipping limit;
- calculating a chrominance magnitude from a chroma A component and a chroma B component;
- producing a composite magnitude signal from the adjusted luminance samples and the chrominance magnitude;
- determining when and by how much the composite magnitude signal exceeds the negative clipping limit or the positive clipping limit to produce an excess signal containing that information;
- converting the excess signal to a gain control signal that is dependent on the excess signal when the excess signal is positive and is independent of the excess signal when the excess signal is negative; and
- diminishing the input luminance signal, the chroma A component and the chroma B component according to the gain control signal to produce a clipped video output.

25. A method for clipping a digital video signal according to claim 24, further comprising the preliminary step of:
- clipping a luminance portion of the digital video signal to produce the input luminance signal.

26. A method for clipping a digital video signal according to claim 24, wherein the adjusting step comprises the step of:
- summing the input luminance signal and a constant to produce an adjusted luminance signal, the constant being one half of the sum of the positive clipping limit and the negative clipping limit, the indicating bit of the adjusted luminance sample being a zero when the adjusted luminance sample is closer to the positive clipping limit and a one when the adjusted luminance sample is closer to the negative clipping limit.

27. A method for clipping a digital video signal according to claim 24, wherein the producing step comprises:
- performing $A+B$ when the indicating bit is in the first state and $A-B$ when the indicating bit is in the second state, A being the adjusted luminance sample and B being the chrominance magnitude, to produce the composite magnitude signal.

28. A method for clipping a digital video signal according to claim 24, wherein the determining step produces the excess signal by implementing a first function $A+B$ if a control bit is a one or a second function $B-A$ if the control bit is a zero, A being the composite magnitude signal, B being a constant that is minus one half of the difference between the positive clipping limit and the negative clipping limit, and the control bit being the sign of the composite magnitude signal.

29. A digital video signal clipping circuit according to claim 24, wherein the converting step comprises the steps of:
- addressing a memory with the excess signal to implement the function $K/K+X$, where K is about one half of the sum of a nominal positive clipping limit and a nominal negative clipping limit and X is the excess signal, the output of the memory being a reduced gain signal; and
- selecting between the value "1" and the reduced gain signal according to a sign bit of the excess signal to produce the gain control signal, so that when the sign bit indicates that the excess signal is negative the "1" is selected and when the sign bit indicates that the excess signal is positive the reduced gain signal is selected.

30. A method for clipping a digital video signal, the method comprising the steps of:
- adjusting each sample of an input luminance signal so that when an indicating bit of a current sample is in a first state the current sample is closer to a first positive clipping limit and when the indicating bit is in a second state the current sample is closer to a first negative clipping limit;
- interpolating between adjusted samples of the input luminance signal to produce a plurality of interpolated samples;
- selecting which sample among the interpolated samples or the current sample is a minimum or maximum depending on whether the indicating bit of the current sample is in the second state or the first state, respectively;
- determining when and by how much the selected minimum sample exceeds the first negative clipping limit or the selected maximum sample exceeds the first positive clipping limit to produce a first excess signal;

converting the first excess signal to a first gain control signal that is dependent on the first excess signal when the first excess signal is positive and is independent of the first excess signal when the first excess signal is negative;

reducing the input luminance signal according to the first gain control signal to produce a clipped luminance signal;

adjusting each sample of the clipped luminance signal so that when an indicating bit of an adjusted clipped luminance sample is in a first state the adjusted clipped luminance sample is closer to a second positive clipping limit and when the indicating bit of the adjusted clipped luminance sample is in a second state the adjusted clipped luminance sample is closer to a second negative clipping limit;

calculating a chrominance magnitude from a chroma A component and a chroma B component;

producing a composite magnitude signal from the adjusted clipped luminance samples and the chrominance magnitude;

determining when and by how much the composite magnitude signal exceeds the second negative clipping limit or the second positive clipping limit to produce a second excess signal containing that information;

converting the second excess signal to a second gain control signal that is dependent on the second excess signal when the second excess signal is positive and is independent of the second excess signal when the second excess signal is negative; and diminishing the clipped luminance signal, the chroma A component and the chroma B component according to the second gain control signal to produce a clipped video output.

* * * * *